(Model.)
R. J. CARSON.
IRON FENCE POST.
No. 281,019. Patented July 10, 1883.
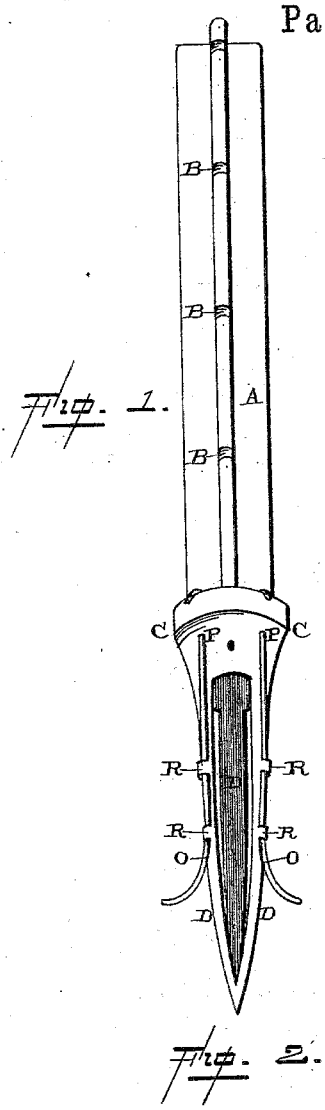
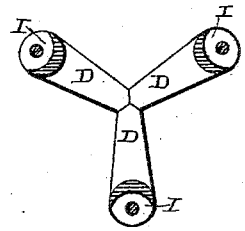
Witnesses.
Louis F. Gardner
E. D. York
Inventor.
R. J. Carson,
per
R. B. Chamberlin
Atty.

United States Patent Office.

ROBERT J. CARSON, OF CHICAGO, ILLINOIS, ASSIGNOR OF SIX-EIGHTHS TO THOMAS GILMORE, OF McCOMB, ILLINOIS, AND J. R. HAMMOND, OF LEADVILLE, COLORADO.

IRON FENCE-POST.

SPECIFICATION forming part of Letters Patent No. 281,019, dated July 10, 1883.

Application filed November 15, 1882. (Model.)

*To all whom it may concern:*

Be it known that I, ROBERT J. CARSON, a citizen of the United States, residing at Chicago, in the county of Cook and State of Illinois, have invented certain new and useful Improvements in Iron Fence-Posts, of which the following is a specification, reference being had therein to the accompanying drawings.

My invention relates to an improvement in iron fence-posts, which are especially intended for use in connection with barbed wire; and it consists in a base having downwardly-projecting ribs or prongs, which are united together at their lower ends, and which have suitable grooves in their outer edges, whereby the iron rods may be driven down through the grooves and made to separate outward in the ground for the purpose of holding the base more securely in position, all of which will be more fully described hereinafter.

Figure 1 represents a perspective of my invention. Fig. 2 is a vertical cross-section taken through the base.

A represents the post, which is made of T-shaped iron, and which has the notches B formed in its edge for the reception of the barbed wires. The lower end of this post is made to fit in a metallic base, C, which is to be driven into the ground. This base has a suitable socket formed in its top to receive the lower end of the post, and has projecting downward from its top the ribs or prongs D. These ribs or prongs are smaller at their lower ends than their upper ones, and are made sharp upon their outer sides, near their lower ends, for the purpose of being driven more easily into the ground. The lower ends of all these ribs or prongs are united together, as shown, so as to form a sharp point; but in between the ribs or prongs, above this point, is left an open space, into which the earth will spring and pack as fast as the base is driven into the ground. Where the base simply displaces the earth it has but a weak hold upon it, and hence the post can be readily pulled up or moved out of position; but where the earth packs into the base so as to form a part of it, as it were, it will readily be seen that the base takes such a firm hold upon the ground that it can only be removed by considerable force.

In order to give the base a firm hold upon the ground, especially when it is very soft, additional means outside of the base itself are used. For this purpose a groove, I, is made in the outer side of each one of the ribs or prongs, and the lower end of each groove is inclined outward, as at O, so that the iron rod which is passed down through the hole P in the top of the base into the groove and through the holding-bands R will have its lower end deflected outward and curved upward, as shown. These outwardly-curved ends act like roots of a tree and take a firm hold upon the ground and help to brace the base in position under all circumstances. If the ground is firm and hard, these iron brace-rods will not be necessary; but where the ground is soft they add very materially in strengthening the base in position.

I am aware that a fence-post composed of metal rods or bars, and which has its lower end formed into a hollow pointed base, is not new, and this I disclaim.

Having thus described my invention, I claim—

1. A base for an iron fence-post, composed of the base C, having a suitable socket in its top, and having a number of prongs, D, sharpened on their outer edges, with a series of iron rods, O, which are forced down through the top of the base and turned outward at their lower ends, substantially as shown.

2. A base for fence-posts, having a number of ribs or prongs projecting down from its under side, each prong having a groove made in its outer side and provided with suitable guiding-eyes, in combination with brace-rods which are driven down through the grooves, substantially as specified.

In testimony whereof I affix my signature in presence of two witnesses.

ROBERT J. CARSON.

Witnesses:
   T. N. BIGLIN,
   C. COBLE.